United States Patent
Kisacikoglu et al.

(10) Patent No.: US 11,532,946 B2
(45) Date of Patent: Dec. 20, 2022

(54) POWER ELECTRONICS CHARGE COUPLER FOR VEHICLE-TO-VEHICLE FAST ENERGY SHARING

(71) Applicant: The Board of Trustees of The University of Alabama, Tuscaloosa, AL (US)

(72) Inventors: Mithat Kisacikoglu, Northport, AL (US); Andrew Lemmon, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 1045 days.

(21) Appl. No.: 16/202,158

(22) Filed: Nov. 28, 2018

(65) Prior Publication Data

US 2019/0165591 A1    May 30, 2019

Related U.S. Application Data

(60) Provisional application No. 62/592,673, filed on Nov. 30, 2017.

(51) Int. Cl.
H02J 7/00    (2006.01)
H02J 7/34    (2006.01)
(Continued)

(52) U.S. Cl.
CPC ............. *H02J 7/342* (2020.01); *B60L 53/14* (2019.02); *B60L 53/20* (2019.02); *H02M 1/143* (2013.01);
(Continued)

(58) Field of Classification Search
CPC ....... H02J 7/342; H02J 2207/20; B60L 53/20; B60L 53/14; B60L 53/665;
(Continued)

(56) References Cited

U.S. PATENT DOCUMENTS 8,299,754 B2    10/2012    Hayashigawa et al.
8,963,481 B2    2/2015    Prosser et al.
(Continued)

FOREIGN PATENT DOCUMENTS

EP    3007315    4/2016
WO    2011163623    12/2011
(Continued)

OTHER PUBLICATIONS

E. Bulut and M. Kisachikoglu, "Mitigating range anxiety via vehicle-to-vehicle social charging system," 2017 IEEE 85th Vehicular Technology Conference (VTC Spring), 5 pages.
(Continued)

*Primary Examiner* — Nathaniel R Pelton
(74) *Attorney, Agent, or Firm* — Meunier Carlin & Curfman LLC (57) ABSTRACT

A power electronics charge coupler (PECC) unit allows vehicle-to-vehicle (V2V) energy transfer by forming a bidirectional buck/boost converter for supplying rapid energy transfer with wide input-output battery voltage and battery voltage levels. The PECC unit embeds DC-DC converter modules into the charging handles of the PECC unit. Each of the charging handles includes a half-bridge of the DC-DC converter and parasitic inductance of a cable between charging handles is utilized as a portion of the filter inductor for the converter. The PECC unit handles are each configured to connect to an electric vehicle and are dynamically configurable in one of four modes of operation based on the battery voltage of the electric vehicles to which the PECC unit is connected and based on which of the electric vehicles is designated as the receiver vehicle and which is designated as the supplier vehicle.

19 Claims, 7 Drawing Sheets

(51) Int. Cl.
*H02M 1/14* (2006.01)
*H02M 3/155* (2006.01)
*B60L 53/20* (2019.01)
*B60L 53/14* (2019.01)
*H02M 3/158* (2006.01)
*B60L 53/66* (2019.01)

(52) U.S. Cl.
CPC ......... *H02M 3/155* (2013.01); *H02M 3/1582* (2013.01); *B60L 53/665* (2019.02); *B60L 2210/10* (2013.01); *H02J 2207/20* (2020.01)

(58) Field of Classification Search
CPC ... B60L 2210/10; H02M 1/143; H02M 3/155; H02M 3/1582
USPC ........................................................ 320/104
See application file for complete search history.

(56) References Cited

U.S. PATENT DOCUMENTS

| | | |
|---|---|---|
| 9,156,362 B2 | 10/2015 | Soden et al. |
| 9,223,372 B2 | 12/2015 | Hintz et al. |
| 9,290,105 B2 | 3/2016 | Zhao et al. |
| 9,365,123 B2 | 6/2016 | Flack |
| 9,421,875 B1 | 8/2016 | Flack |
| 9,511,676 B2 | 12/2016 | Loftus et al. |
| 9,533,599 B2 | 1/2017 | Soden et al. |
| 2012/0299531 A1 | 11/2012 | Prosser et al. |
| 2012/0299544 A1 | 11/2012 | Prosser et al. |
| 2012/0303213 A1 | 11/2012 | Prosser et al. |
| 2012/0303259 A1 | 11/2012 | Prosser |
| 2012/0303397 A1 | 11/2012 | Prosser |
| 2013/0049689 A1 | 2/2013 | Hayashigawa et al. |
| 2014/0375272 A1 | 12/2014 | Johnsen et al. |
| 2015/0303737 A1 | 10/2015 | Steinbuchel, IV et al. |
| 2015/0367742 A1 | 12/2015 | Soden et al. |
| 2016/0347191 A1 | 12/2016 | Hayashigawa et al. |
| 2016/0368390 A1* | 12/2016 | Yang .................. B60L 1/14 |
| 2017/0066340 A1 | 3/2017 | Flack |
| 2017/0066341 A1 | 3/2017 | Soden et al. |
| 2018/0086212 A1* | 3/2018 | Dudar .................. H04B 5/0037 |
| 2019/0001833 A1* | 1/2019 | Coburn .................. B60L 53/60 |

FOREIGN PATENT DOCUMENTS

| | | |
|---|---|---|
| WO | 2012078822 | 6/2012 |
| WO | 2012078921 | 6/2012 |
| WO | 2012129104 | 9/2012 |

OTHER PUBLICATIONS

M. Ehsani, Y. Gao, and A. Emadi, Modern electric, hybrid electric, and fuel cell vehicles. Boca Raton, FL: CRC Press, 2010, pp. 1-23 and 176-179.

Anegawa T., "Safety Design of CHAdeMO Quick Charging Systm", World Electric Vehicle Journal vol. 4—ISSN 2032-6653, 2010, pp. 000855-000859.

Fan, et al., Wide VIN and High-Power Challenges with Buck-Boost Converters, Jun. 22, 2015, 9 pages. Accessed on-line http://www.powerelectronics.com/dc-dc-converters/wide-vin-and-high-power-challenges-buck-boostconverters.

\* cited by examiner

POWER ELECTRONICS CHARGE COUPLER FOR VEHICLE-TO-VEHICLE FAST ENERGY SHARING

CROSS-REFERENCE TO RELATED APPLICATIONS

This application claims the benefit of priority to 62/592,673 filed Nov. 30, 2017, the disclosure of which is incorporated herein by reference in its entirety.

BACKGROUND

Electric Vehicles (EVs) are expected to storm the modern transportation and energy systems. They are three times more efficient than gasoline cars, require much less maintenance, and are proven to be more reliable. Due to such excitement, there have been significant efforts to accelerate wide-scale adoption by addressing some of the challenges, which may help boost EV usage further. For example, efforts are under way to increase EV range and number of charging stations, decreasing charging time, and manage grid impacts. While each of these challenges is being evaluated in light of new battery technologies, fast/ultra-fast chargers, stationary/dynamic wireless charging, and infrastructure enhancements, such solutions come with certain barriers in terms of costs and practicality. Alternative methods should be in place to make charging more flexible and marketable leading to much faster and wider EV adoption.

SUMMARY

According to some aspects of the disclosure, a power electronics charge coupler (PECC) unit comprises a first charging handle comprising a first DC-DC half-bridge converter. The PECC unit also comprises a second charging handle comprising a second DC-DC half-bridge converter. The PECC unit also comprises a cable configured to electrically couple the first charging handle with the second charging handle.

In some implementations, the cable comprises a charge line and a ground line separated by a dielectric membrane. In some implementations, the first charging handle and the second charging handle are couple by the cable to form a DC-DC full-bridge converter, where a portion of a filter inductor of the DC-DC full-bridge converter is provided by parasitic inductance of the cable.

In some implementations, the first and second DC-DC half-bridges each comprise a smoothing capacitor connected across a charge line and a ground line of the first charging handle. The DC-DC half-bridges also each comprise a pair of switches in series with each other and connected in parallel to the smoothing capacitor across the charge line and the ground line of the first charging handle. The DC-DC half-bridges also each comprise a filter inductor with a first side of the filter inductor connected between the pair of switches and a second side of the filter inductor connected to a charge line of the cable. In some implementations, each of the pair of switches is a power MOSFET. In some implementations, the power MOSFET switch is a SiC MOSFET. In some implementations, the SiC MOSFET is two paralleled 25 mΩ SiC MOSFETs. In some implementations, the SiC MOSFET is a 15 mΩ SiC MOSFET. In some implementations, the power MOSFET is contained in a four-lead TO-247 package.

In some implementations, the first DC-DC half-bridge converter comprises a first pair of switches and the first charging handle comprises a first digital signal processor (DSP) adapted to configure the pair of switches to operate the first charging handle as a charge supplier or a charge receiver. The first DSP is adapted to configure one of the first pair of switches to actively modulate a transfer of charge across the PECC unit and the other of the first pair of switches to operate as a synchronous rectifier. The second DC-DC half-bridge converter comprises a second pair of switches and the second charging handle comprises a second DSP adapted to configure the second pair of switches to operate the second charging handle as a charge supplier or a charge receiver. The second DSP is adapted to configure one of the second pair of switches to statically remain on and the other of the second pair of switches to statically remain off. The first DC-DC half-bridge converter is configured to switch between operating between a buck mode of operation and a boost mode of operation.

According to some aspects of the disclosure, a method of charging a receiver electric vehicle from a supplier electric vehicle with a PECC unit comprises receiving, by a first DSP in a first charging handle of the PECC unit coupled to the supplier electric vehicle, a first message comprising a first value of a voltage of a battery pack of the supplier electric vehicle. The method also comprises receiving, by the first DSP, a second message comprising a second value of a voltage of a battery pack of the receiver electric vehicle. The method also comprises comparing, by the first DSP, the first value to the second value to determine which is larger. The method also comprises configuring, by the first DSP, a first pair of switches in a first DC-DC half-bridge converter in the first charging handle based on the comparison.

In some implementations, the method further comprises receiving, by a second DSP in a second charging handle of the PECC unit coupled to the receiver electric vehicle, a third message comprising the second value of the voltage of the battery pack of the receiver electric vehicle. The method also comprises receiving, by the second DSP, a fourth message comprising the first value of the voltage of the battery pack of the supplier electric vehicle. The method also comprises comparing, by the second DSP, the first value to the second value to determine which is larger. The method also comprises configuring, by the second DSP, a second pair of switches in a second DC-DC half-bridge converter in the second charging handle based on the comparison.

In some implementations, the first pair of switches in the first DC-DC half-bridge converter comprises configuring one of the first pair of switches to actively modulate a transfer of charge from the supplier electric vehicle to the receiver electric vehicle and the other of the first pair of switches to operate as a synchronous rectifier.

In some implementations, configuring the first pair of switches in the first DC-DC half-bridge converter comprises configuring one of the first pair of switches to statically remain on and the other of the first pair of switches to statically remain off.

In some implementations, the method further comprises receiving, by the first DSP, fifth message with a value of a minimum allowed voltage of the battery pack of the supplier electric vehicle.

In some implementations, the method further comprises receiving, by the second DSP, a sixth message with a value of a maximum voltage of the battery pack of the receiver electric vehicle.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Ubiquitous vehicle-to-vehicle (V2V) energy transfer could significantly accelerate electric vehicle (EV) adoption rates by helping reduce range anxiety and at the same time decrease the required infrastructure costs associated with large charging station networks. V2V charging provides a safe, fast, efficient, grid-flexible, and cost-effective solution for EV charging, especially as a demand response tool during peak times. Additionally, leveraging such ubiquitous V2V energy transfer through a charge sharing network (CSN) based on the increasingly common sharing economy framework facilitates matching up and authorizing supplier and receiver vehicles.

To realize this goal, disclosed herein is a power electronics charge coupler (PECC) unit that allows V2V energy transfer by embedding DC-DC converter modules into the PECC unit. A half-bridge of the DC-DC converter can fit into each of the PECC "handles" and the cable between the PECC handles is utilized as a portion of the filter inductor for the DC-DC converter. The PECC handles are each configured to connect to an electric vehicle to facilitate the V2V energy transfer. The two half-bridge modules and the cable form a bidirectional buck/boost converter for supplying rapid energy transfer with wide input-output battery voltage and state of charge (SoC) levels.

In some implementations, the PECC unit is compatible with the most widely available DC charging station standard in the U.S., namely, CHAdeMO. In some implementations, the PECC unit will come with a 25 kW power rating for each charging unit with a stackable option to 50 kW. The PECC units are 'stackable' in that two PECC units can connect between two EVs to operate in parallel and operate to increase the charging power rate. The stacked PECC units may connect to each of the EVs through a y-adaptor, can be stacked on top of each other, or the like.

The PECC unit can supplement currently available EV charging stations with mobile and available on-demand chargers. Further, the PECC unit has a small up-front investment cost an order(s) of magnitude less than building new fast/ultra-fast charging stations where station hardware, labor, transformer, and permit costs can add up to more than $50 k per single station.

Some products have provided for energy exchange between two EVs, but are focused on stranded EVs that need to be rescued. As a result, such products tend to be bulky (9.25 ft$^3$) and heavy (90 kg). The large size and weight of such solutions does not lend itself to a ubiquitous V2V charge sharing solution. In contrast, the disclosed PECC unit provides fast energy transfer (e.g., up to 40 mi of range in 15 min) within a small form factor (e.g., less than 3 kg per handle). Accordingly, the disclosed PECC unit may supplant jumper cables as the preeminent piece of equipment in EV emergency tool kits.

Additionally, the disclosed PECC unit, in some implementations, does not provide a grid-connection and thereby reduces the required conversion stages and eliminates the isolation requirement on the converter. Further, although the power transfer is kept at a similar rate (50 kW), in some implementations, the PECC unit will result in a much smaller form factor due to the use of Silicon Carbide (SiC) transistors and a high switching frequency (100-300 kHz).

Figure 1:
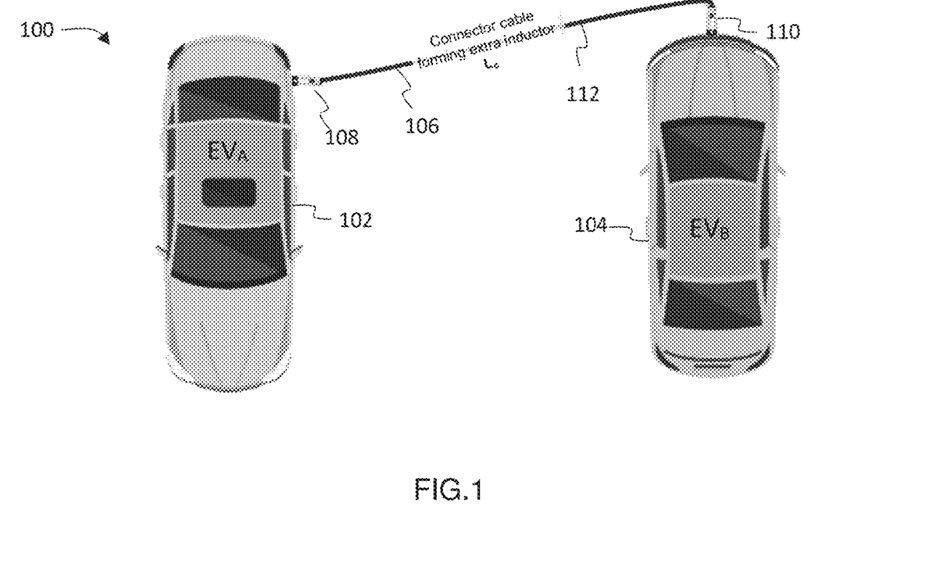
FIG. 1 illustrates a system diagram of vehicle-to-vehicle charging system using a power electronics charge coupler (PECC) unit suitable for implementing the several embodiments of the disclosure.

FIG. 1 illustrates a system diagram of V2V charging system 100. The V2V charging system 100 includes a PECC unit 106 connected between a $EV_A$ 102 and $EV_B$ 104 suitable for implementing the several embodiments of the disclosure. While $EV_A$ 102 and $EV_B$ 104 are described herein as EVs, it should be understood that either or both of these vehicles could be hybrid electric vehicles, a combustion engine vehicle with a battery pack, or any other type of vehicle with a battery pack provided that both of the vehicles have a DC charging port. Additionally, either or both of the $EV_A$ 102 and $EV_B$ 104 can be substituted for other infrastructure that connect to the grid, such as a charging station with a DC charging port or DC bus, or connect to a stationary battery pack, such as at a residential or commercial real estate location.

The PECC unit 106 includes a charging handle 108, a charging handle 110, and a cable 112. The charging handle 108 includes a plug (not shown) configured to physically connect the charging handle 108 to a charging port of $EV_A$ 102. Similarly, the charging handle 110 includes a plug (not shown) configured to physically connect the charging handle 110 to a charging port of $EV_B$ 104. The cable 112 provides both an electrical and data communication connection between the charging handle 108 and the charging handle 110.

The PECC unit 106 is a bidirectional DC-DC converter for supplying rapid energy transfer between $EV_A$ 102 and $EV_B$ 104. In some implementations, the PECC unit 106 is a non-isolated bidirectional DC-DC converter for supplying rapid energy transfer between $EV_A$ 102 and $EV_B$ 104. Galvanic isolation between two vehicles is assumed to not be required because each vehicle electrical systems will be isolated from the grid and all other sources/sinks during operation.

The PECC unit 106 is directionally agnostic and is capable of bidirectional power transfer, with the direction of charge transfer determined by onboard DSPs in each of the charging handles 108, 110. Accordingly, either of $EV_A$ 102 and $EV_B$ 104 may be a supplier vehicle or a receiver vehicle. A supplier vehicle transfers energy from a battery pack in the supplier vehicle to a battery pack in the receiver vehicle. Likewise, a receiver vehicle receives energy transferred from the battery pack in the supplier vehicle and stores the received energy in the battery pack of the receiver vehicle. In the examples provided below $EV_A$ 102 will be referenced as a supplier vehicle and $EV_B$ 104 will be referenced as a receiver vehicle. The disclosure should in no way be limited to this example and one of ordinary skill in the art will recognize that $EV_A$ 102 can be a receiver vehicle and $EV_B$ 104 can be a supplier vehicle.

As described in more detail below, the bidirectional DC-DC converter of the PECC unit 106 is split into two physical PECC modules that are each packaged into the two charging handles 108, 110 on either end of the PECC unit 106. Each PECC module includes a half-bridge power stage with an appropriate set of gate-drive circuits, a digital signal processor (DSP), a voltage sensing circuit to measure the local EV battery voltage ($V_A$, $V_B$), and a current sensor to measure the real-time current of the local half-bridge ($I_A$, $I_B$). Each DSP will communicate with a locally-connected vehicle via a controller area network (CAN) bus, and the DSPs will communicate to one another through a data link embedded in the charging cable to coordinate the operation of the two PECC modules.

Figure 2:
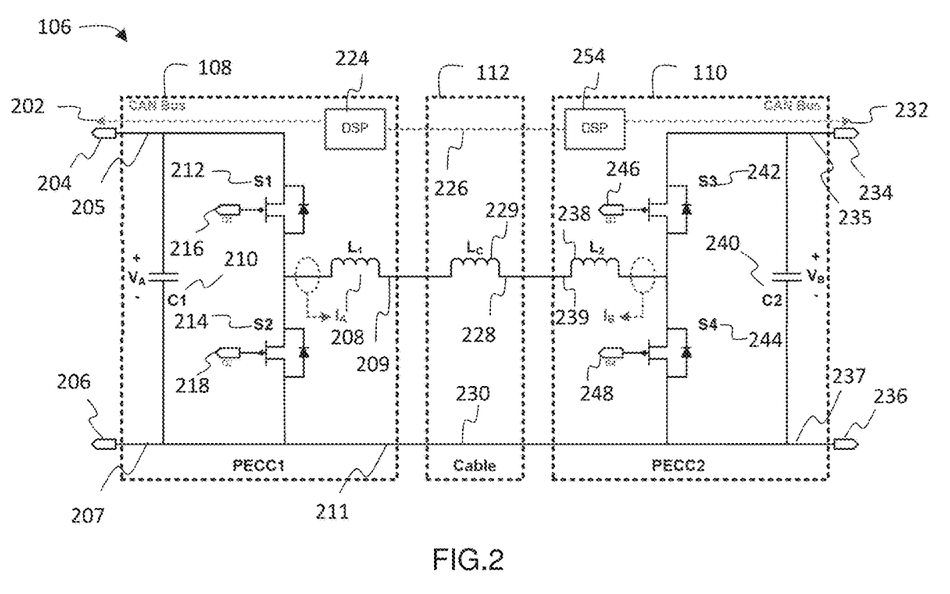
FIG. 2 illustrates a circuit diagram of the PECC unit of FIG. 1 suitable for implementing the several embodiments of the disclosure.

FIG. 2 illustrates a circuit diagram of the PECC unit 106 of FIG. 1 suitable for implementing the several embodiments of the disclosure. The charging handle 108 of the PECC unit 106 includes a plug side and a cable 112 side. The plug side of the charging handle 108 includes a data connector 202, a positive terminal 204, and negative terminal 206. The data connector 202 may be a CAN bus connector for communicatively coupling with a corresponding CAN bus in the charging port of an EV, such as $EV_A$ 102. The data connector 202, positive terminal 204, and negative terminal 204 may be configured in any desired manner. In some implementations the PECC unit 106 is configured in accordance with the CHAdeMO standard. For example, the PEEC unit 106 may also include additional analog connectors and associated circuitry for communicating a start-of-charging signal, recognizing the start-of charging, communicating a start permission signal, recognizing the start permission signal, communicating a charging ready signal, recognizing the charging ready signal, communicating a charging stop signal, and recognizing the charging stop signal. Other standards or configurations may be used.

In some implementations, an adaptor (not shown) may be affixed to the plug of the charging handle 108 of the PECC unit 106 for adapting the configuration of the data connector 202, positive terminal 204, and negative terminal 204 from a first standard used by the PECC unit 106 to a second standard used by an EV, such as $EV_A$ 102. The data connector 202, positive terminal 204, and negative terminal 204 may be implemented as one or more pins or sockets. Additionally, while each may only have a single pin or socket, one or more of the data connector 202, positive terminal 204, and negative terminal 204 may have more than one pin and/or socket.

The charging handle 108 includes a DC-DC half-bridge converter circuit including an inductor 208, a smoothing capacitor 210, a switch S1 212, and a switch S2 214. The inductor 208 may be a ferrite-based filter inductor for the half-bridge converter. As shown in FIG. 2, the capacitor 210 is coupled between a charge line 205, which is electrically coupled to the positive terminal 204, and a ground line 207, which is electrically coupled to the negative terminal 204. Switches S1 212 and S2 214 are arranged in series with one another and in parallel to the capacitor 210. A drain of S1 212 electrically coupled to the charge line 205 and the positive terminal 204. A source of S1 212 and a drain of S2 214 are electrically coupled to a first side of the inductor 208. A second side of the inductor 208 is coupled to the charge line 209 on the cable 112 side of the charging handle 108. A source of S2 214 is electrically coupled to the ground line 207 and the negative terminal 204.

Operation of the switches S1 212 and S2 214 is controlled by a digital signal processor (DSP) 224 by applying voltages to a gate 216 of S1 212 and a gate 218 of S2 214, as described in more detail below. The DSP 224 operates the switches S1 212 and S2 214 based on communications over a can bus from a companion DSP 254 on the charging handle 110 and/or from $EV_A$ 102 via the data connector 202. Operation of the DSP 224 is described in more detail below with reference to FIG. 3A.

The cable 112 of the PECC unit 106 includes a data communication line 226, a charge line 228, and a ground line 230. Splitting a full-bridge DC-DC converter into two half-bridge DC-DC converters makes it possible to physically package the each of the half-bridge DC-DC converters into the two charging handles 108, 110 of the PECC cable 106 and at the same time leverage the parasitic inductance 229 of the cable to minimize the size of the required in-box filter inductors 208, 238. For example, a standard 3-meter charging cable can be easily adjusted to incorporate 3-5 µH of self-inductance simply by separating the charge line 228 and ground line 230 conductors with a fixed, 1" wide dielectric membrane (not shown). This will also provide a measure of fault-tolerance to the system, as this air-core inductor 229 cannot saturate, thereby providing an intrinsic current rate-limit across the cable 112.

The charging handle 110 of the PECC unit 106 includes a plug side and a cable 112 side. The plug side of the charging handle 110 includes a data connector 232, a positive terminal 234, and a negative terminal 236. The data connector 232 may be a CAN bus connector for communicatively coupling with a corresponding CAN bus in the charging port of an EV, such as $EV_B$ 104. The data connector 232, positive terminal 234, and negative terminal 236 may be configured in any desired manner and in some implementations is configured in accordance with the CHAdeMO standard. Other standards or configurations may be used. While described as pins above, one or more of the data connector 232, positive terminal 234, and negative terminal 236 may be implemented as one or more pins or sockets. Additionally, while each may only have a single pin or socket, one or more of the data connector 232, positive terminal 234, and negative terminal 236 may have more than one pin and/or socket.

The charging handle 110 includes a second DC-DC half-bridge converter circuit including an inductor 238, a smoothing capacitor 240, a switch S3 242, and a switch S4 244. The inductor 238 may be a ferrite-based filter inductor for the converter. As shown in FIG. 2, the capacitor 240 is coupled between a charge line 235, which is electrically coupled to the positive terminal 234, and a ground line 237, which is electrically coupled to the negative terminal 236. Switches S3 242 and S4 244 are arranged in series with one another and in parallel to the capacitor 240. A drain of S3 242 electrically coupled to the charge line 235 and the positive terminal 234. A source of S3 242 and a drain of S4 244 are electrically coupled to a first side of the inductor 238. A second side of the inductor 238 is coupled to the charge line 239 on the cable 112 side of the charging handle 110. A source of S4 244 is electrically coupled to the ground line 237 and the negative terminal 236.

Operation of the switches S3 242 and S4 244 is controlled by a digital signal processor (DSP) 254 by applying voltages to a gate 246 of S3 242 and a gate 248 of S4 244, as described in more detail below. The DSP 254 operates the switches S3 242 and S4 244 based on communications over a can bus from a companion DSP 224 on the charging handle 108 and/or from $EV_B$ 102 via the data connector 232. Operation of the DSP 254 is described in more detail below with reference to FIG. 3B.

As shown in FIG. 2 the switches S1 212, S2 214, S3 242, and S4 244 are power metal-oxide-semiconductor field-effect transistor (MOSFET) devices. Other switching devices may be used. In some implementations, the switches S1 212, S2 214, S3 242, and S4 244 are 1.2 kV, 25 mΩ SiC MOSFET's in a 4-lead TO-247 discrete package, such as those provided from Monolith Semiconductor, Inc. Other components may be used for the switches S1 212, S2 214, S3 242, and S4 244. For example, the switches S1 212, S2 214, S3 242, and S4 244 may be implemented with silicon insulated gate bipolar transistors (IGBTs). The 1.2 kV, 25 mΩ SiC has reliable third-quadrant behavior and a rugged body diode which eliminates the need for anti-parallel diodes and reduces the total semiconductor area requirement for the switches S1 212, S2 214, S3 242, and S4 244 from 156 mm$^2$ per charging handle with anti-parallel diodes to 80 mm$^2$ per charging handle without anti-parallel diodes (reduction of 48%). The DC-DC converter in the charging handles 108, 110 can operate in hard-switched operation at 200-300 kHz, at least one order of magnitude higher than would be possible with Silicon IGBTs. This will enable a dramatic reduction in the mechanical size of the required filtering components, including the ancillary ferrite-based filter inductors 208, 238 and the smoothing capacitors 210, 240.

The four-lead TO-247 package effectively eliminates the common-source-inductance (CSI) inherent in a traditional TO-247 package. Eliminating CSI has been shown to reduce switching losses as much as 30-50% over the traditional three-lead TO-247 package, which will substantially reduce the waste heat generated by the switches S1 212, S2 214, S3 242, and S4 244 in the charging handles 108, 110. Other package types or configurations may be used.

A single discrete 25 mΩ SiC MOSFET can handle 75% of the expected load, depending on the thermal impedance of the heat-sink design for the charging handles 108, 110. While only a single switch is shown at each switch location, in some implementations, two paralleled MOSFETs may be provided per switch position. For example, switch S1 212 may be replaced with two paralleled MOSFETs. In some implementations, a single discrete-packaged 15 mΩ SiC MOSFET would replace the two paralleled 25 m Ω SiC MOSFET's to further reduce the device area in the charging handles 108, 110.

Other circuits, components, and configurations may be present in the PECC unit 106. For example, as discussed above, each of the charging handles 108, 110 may additionally have a voltage sensing circuit to measure the local EV battery voltage ($V_A$, $V_B$), and a current sensor to measure the real-time phase current of the local half-bridge ($I_A$, $I_B$).

In some implementations, rather than embedding the DC-DC converter in the charging handles of the PECC unit 106, one alternative design considered would involve building a separate DC-DC converter box between two EVs with separate cables between the converter box and each vehicle. However, this option increases the total space required in the trunk of an EV in part based on the need for larger filter inductors. This solution would make the design of the charge couple cables easier. In this case, the cables can be separately plugged into the separate DC-DC converter box and to each of the EVs.

Figure 3A:
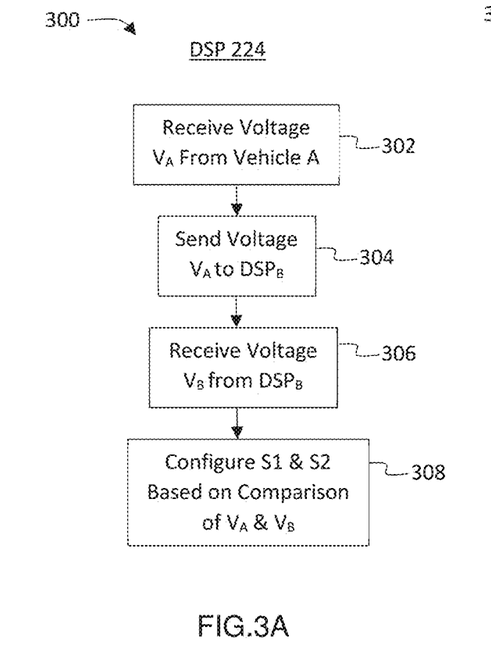
FIGS. 3A and 3B illustrate flow diagrams of the operation of the digital signal processors (DSPs) in the circuit diagram of FIG. 2 suitable for implementing the several embodiments of the disclosure.
Figure 3B:
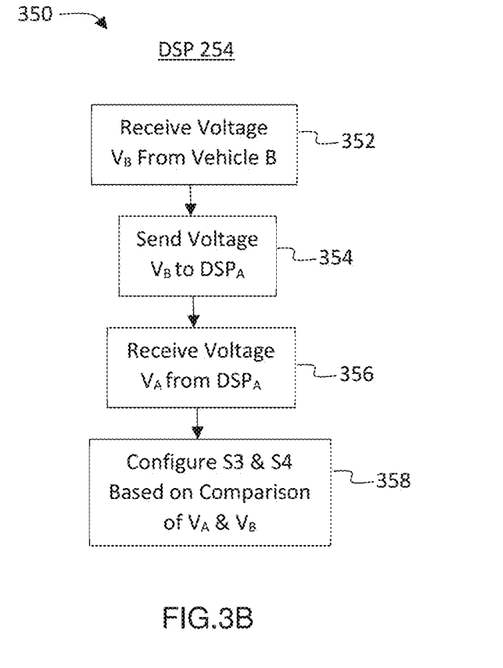

FIGS. 3A and 3B illustrate flow diagrams 300, 350 of the operation of the DSPs 224 and 254 in the circuit diagram of FIG. 2 when the charging handles 108, 110 are connected to $EV_A$ 102 and $EV_B$ 104, respectively. In the examples shown in FIGS. 3A and 3B, the $EV_A$ 102 is a supplier vehicle and $EV_B$ 104 is a receiver vehicle.

As shown in FIG. 3A, at 302, the DSP 224 receives a communication with a value of voltage $V_A$, which is a voltage value of the battery pack in $EV_A$ 102. As discussed with reference to FIG. 2 above, the DSP 224 receives the communication from $EV_A$ 102 via the data connector 202 on the charging handle 108. Upon receiving the value of voltage $V_A$, at 304, the DSP 224 sends the value of $V_A$ over the communication line 226 of the cable 212 to the DSP 254 in the charging handle 110. Likewise, at 306, the DSP 224 communicates with the DSP 254 to receive a value of voltage $V_B$, which is a voltage value of the battery pack in $EV_B$ 104. That is, the DSP 224 receives the value of $V_B$ over the communication line 226 of the cable 212 from the DSP 254 in the charging handle 110. At 308, the DSP 224 configures switches S1 212 and S2 214 based on a comparison of the values of $V_A$ and $V_B$ and the knowledge that $EV_A$ 102 is the supplier vehicle and that $EV_B$ 104 is the receiver vehicle. That is, based on the comparison of the values of $V_A$ and $V_B$, the DSP 224 drives the voltages of the gates 216, 218 to operate in a boost or buck mode of operation, described in more detail below.

As shown in FIG. 3B, at 352, the DSP 254 receives a communication with a value of voltage $V_B$, which is a voltage value of the battery pack in $EV_B$ 104. As discussed with reference to FIG. 2 above, the DSP 254 receives the communication from $EV_B$ 104 via the data connector 232 on the charging handle 110. Upon receiving the value of voltage $V_B$, at 354, the DSP 254 sends the value of $V_B$ over the communication line 226 of the cable 212 to the DSP 224 in the charging handle 108. Likewise, at 356, the DSP 254 communicates with the DSP 224 to receive a value of voltage $V_A$, as described above. That is, the DSP 254 receives the value of $V_A$ over the communication line 226 of the cable 212 from the DSP 224 in the charging handle 108. At 358, the DSP 254 configures switches S3 242 and S4 244 based on a comparison of the values of $V_A$ and $V_B$ and the knowledge that $EV_A$ 102 is the supplier vehicle and that $EV_B$ 104 is the receiver vehicle. That is, based on the comparison of the values of $V_A$ and $V_B$, the DSP 254 drives the voltages of the gates 246, 248 to operate in a boost or buck mode of operation, described in more detail below.

In other words, DSPs 224, 254 are configured to cooperate to facilitate comparison of the voltages of the battery packs of the EVs 102, 104 and together configure the switches S1 212, S2 214, S3 242, S4 244 to operate in a boost or buck mode of operation.

In some implementations, rather than receiving the value of voltages $V_A$ and $V_B$ via a communication on the CAN bus, the DSPs 224, 254 may receive a value of voltages $V_A$ and $V_B$ from a voltage sensing circuit (not shown) in each of the charging handles 108, 110.

Other communications and operations may be performed by the DSPs 224, 254. For example, the DSPs may each receive a communication from their respective local EV indicating whether that EV is to be a receiver or supplier vehicle. For example, DSP 224 can be configured receive a communication from $EV_A$ 102 indicating that the DC-DC half-bridge in the charging handle 108 should be configured to facilitate supplying power to $EV_B$ 104. Likewise, DSP 254 can be configured receive a communication from $EV_B$ 104 indicating that the DC-DC half-bridge in the charging handle 110 should be configured to facilitate receiving power from $EV_A$ 102. Additionally, DSPs 224, 254 can be configured communicate with each other to verify that only one of the charging handles 108, 110 is configured as a supplier and only one of the charging handles 108, 110 is configured as a receiver. That is, DSPs 224, 254 can be configured to ensure that the charging handles 108, 110 are not both configured as a supplier or receiver.

While two DSPs 224, 254 are show in the example of FIG. 2, in some implementations, a single DSP may be present in only one of the charging handles 108, 110 for communicating with both $EV_A$ 102 and $EV_B$ 104 and configuring all of switches S1 212, S2 214, S3 242, and S4 244 for operation. In such an implementation, additional communication lines may be present in the cable 112 to facilitate communication between the single DSP and the components in the opposite charging handle.

Because the PECC unit 106 is capable of bidirectional power transfer, the DC-DC half-bridge converter circuits have four separate operational modes depending on the battery voltage of each of $EV_A$ 102 and $EV_B$ 104 and which of $EV_A$ 102 and $EV_B$ 104 is identified as the supplier and receiver vehicle. These four operational modes are provided in Table 1 below.

Generally, a vehicle with a higher pack voltage can charge a vehicle with a lower pack voltage by configuring the switches in the DC-DC half-bridges in the charging handles 108, 110 in a buck mode of operation. Similarly, a vehicle with a lower pack voltage can charge a vehicle with a higher pack voltage by configuring the switches in the DC-DC half-bridges in the charging handles 108, 110 in a boost mode of operation. It is also possible that the supplier vehicle pack voltage may transition through the receiver vehicle pack voltage during charge exchange. In this case, a mode transition will occur, as directed by the local charge transport algorithm running on the DSPs. In every mode of operation shown in Table 1, one of the charging handles 108, 110 is configured with one switch which is actively modulating the flow of power between the vehicles (Active) and one switch which is operating as a synchronous rectifier (SR). The other of the charging handles 108, 110 with the remaining two switches are fixed in a constant state (ON/OFF) to statically attach to the sink (buck mode) or source (boost mode).

TABLE 1

| $EV_A$ | $EV_B$ | Voltage | Mode | S1 | S2 | S3 | S4 |
|---|---|---|---|---|---|---|---|
| Supplier | Receiver | $V_A > V_B$ | Buck-AB | Active | SR | ON | OFF |
| Supplier | Receiver | $V_A < V_B$ | Boost-AB | ON | OFF | SR | Active |
| Receiver | Supplier | $V_A > V_B$ | Boost-BA | SR | Active | ON | OFF |
| Receiver | Supplier | $V_A < V_B$ | Buck-BA | ON | OFF | Active | SR |

For example, as shown in the first row of Table 2 above, $EV_A$ 102 is designated as the supplier vehicle and $EV_B$ 104 is designated as the receiver vehicle. Based on the measured and/or communicated battery voltage of the EVs 102, 104, DSPs 224, 254 each determine that $V_A$ is greater than $V_B$. Accordingly, DSP 224 controls the voltages applied to the gates 216, 218 of switches S1 212 and S2 214 to operate the DC-DC half-bridge in the charging handle 108 in the buck mode of operation. Switch S1 212 is configured to actively modulating the flow of power from $EV_A$ 102 to $EV_B$ 104 and switch S2 214 is configured to operate as a synchronous rectifier. Likewise DSP 254 controls the voltages applied to gates 246, 248 of switches S3 242 and S4 244 to operate the DC-DC half-bridge in the charging handle 110 to statically attach to the sink provided by the DC-DC half-bridge in the charging handle 108. Switch S3 242 is configured to statically remain on and switch S4 244 is configured to statically remain off.

For example, as shown in the second row of Table 2 above, $EV_A$ 102 is designated as the supplier vehicle and $EV_B$ 104 is designated as the receiver vehicle. Based on the measured and/or communicated battery voltage of the EVs 102, 104, DSPs 224, 254 each determine that $V_A$ is less than $V_B$. Accordingly, DSP 224 controls the voltages applied to the gates 216, 218 of switches S1 212 and S2 214 to operate the DC-DC half-bridge in the charging handle 108 to statically attach to the source provided by the DC-DC half-bridge in the charging handle 110. Switch S1 212 is configured to statically remain on and switch S2 214 is configured to statically remain off. Likewise DSP 254 controls the voltages applied to gates 246, 248 of switches S3 242 and S4 244 to operate the DC-DC half-bridge in the charging handle 110 in the boost mode of operation. Switch S4 244 is configured to actively modulating the flow of power from $EV_A$ 102 to $EV_B$ 104 and switch S3 242 is configured to operate as a synchronous rectifier.

For example, as shown in the third row of Table 2 above, $EV_A$ 102 is designated as the receiver vehicle and $EV_B$ 104 is designated as the supplier vehicle. Based on the measured and/or communicated battery voltage of the EVs 102, 104, DSPs 224, 254 each determine that $V_A$ is greater than $V_B$. Accordingly, DSP 224 controls the voltages applied to the gates 216, 218 of switches S1 212 and S2 214 to operate the DC-DC half-bridge in the charging handle 108 in the boost mode of operation. Switch S2 214 is configured to actively modulating the flow of power from $EV_B$ 104 to $EV_A$ 102 and switch S1 212 is configured to operate as a synchronous rectifier. Likewise DSP 254 controls the voltages applied to gates 246, 248 of switches S3 242 and S4 244 to operate the DC-DC half-bridge in the charging handle 110 to statically attach to the source provided by the DC-DC half-bridge in the charging handle 108. Switch S3 242 is configured to statically remain on and switch S4 244 is configured to statically remain off.

For example, as shown in the fourth row of Table 2 above, $EV_A$ 102 is designated as the receiver vehicle and $EV_B$ 104 is designated as the supplier vehicle. Based on the measured and/or communicated battery voltage of the EVs 102, 104, DSPs 224, 254 each determine that $V_A$ is less than $V_B$. Accordingly, DSP 224 controls the voltages applied to the gates 216, 218 of switches S1 212 and S2 214 to operate the DC-DC half-bridge in the charging handle 108 to statically attach to the sink provided by the DC-DC half-bridge in the charging handle 110. Switch S1 212 is configured to statically remain on and switch S2 214 is configured to statically remain off. Likewise DSP 254 controls the voltages applied to gates 246, 248 of switches S3 242 and S4 244 to operate the DC-DC half-bridge in the charging handle 110 in the buck mode of operation. Switch S3 242 is configured to actively modulating the flow of power from $EV_B$ 104 to $EV_A$ 102 and switch S4 244 is configured to operate as a synchronous rectifier.

Considering the substantial power levels involved in the implementation of the PECC unit 106, fault-detection and handling is an emphasis of the electrical system design. A fault analysis resulted in the identification of four different fault conditions, which are enumerated in Table 3 below.

TABLE 1

| No. | Fault | Detection |
| --- | --- | --- |
| 1 | Vehicle pack over-voltage | $V_A > V_{A\_Max}$; or $V_B > V_{B\_Max}$ |
| 2 | Vehicle pack under-voltage | $V_A < V_{A\_Min}$; or $V_B < V_{B\_Min}$ |
| 3 | Over-current | $I_A > I_{A\_Max}$; or $I_B > I_{B\_Max}$ |
| 4 | Ground Fault Condition | $abs(I_A - I_B) > I_{GF\_thresh}$ |

Faults 1 and 2 deal with over- and under-voltage conditions, respectively, for the DC charging ports of each vehicle. During initialization, the DSPs 224, 254 will establish maximum and minimum acceptable pack voltage values for each vehicle, based on the specific vehicle's nominal pack voltage (these thresholds cannot be established a-priori due to the existence of different nominal EV pack voltages). For example, DSP 224 communicates with $EV_A$ 102 through the data connector 202 to receive a communication from $EV_A$ 102 that indicates a maximum voltage for $V_A$. DSP 254 communicates with $EV_B$ 104 through the data connector 232 to receive a communication from $EV_B$ 104 that indicates a maximum voltage for $V_B$. Throughout the charge sharing operation, each of DSPs 224, 254 will monitor the local pack voltage ($V_A$, $V_B$) and charging will be immediately suspended if either vehicle pack voltage triggers Fault 1 or Fault 2. These faults could occur due to spurious charging cable disconnection (Fault 2) or battery malfunction (Fault 1 or Fault 2).

Fault 3 involves detection of an over-current condition on either side "A" or "B". This condition could be caused by a low-impedance failure of the cabling, connector, or a battery malfunction. Fault 4 is triggered by the two DSP's recognizing that the average current on either side of the charging cable is different by more than a threshold value $I_{GF}$. Occurrence of this condition likely indicates that the charge current is returning to the supplier vehicle by some means other than the charging cable return line, indicating a potentially-dangerous ground fault.

Regardless of the specific fault detected, the DSPs 224, 254 will: (1) immediate suspend the charging by disabling the Active and SR switches; and (2) establish galvanic isolation of the charging cable by disabling the ON switch. The DSPs 224, 254 may additionally: (3) generate an error message potentially with an audible alert to the user; and (4) lockout of further charging operations until the faulted conditions are cleared and the charging cable is removed and replaced from both vehicles. The error message may be communicated by the DSPs 224, 254 to the user by way of a message communicated over the CAN bus to each of the local vehicles for display on resident user interfaces. The users may interact with the user interface of the local vehicles to clear the fault conditions on the PECC unit 106. Other means of communicating fault messages, such as via the users mobile devices, may also be used.

Figure 4A:
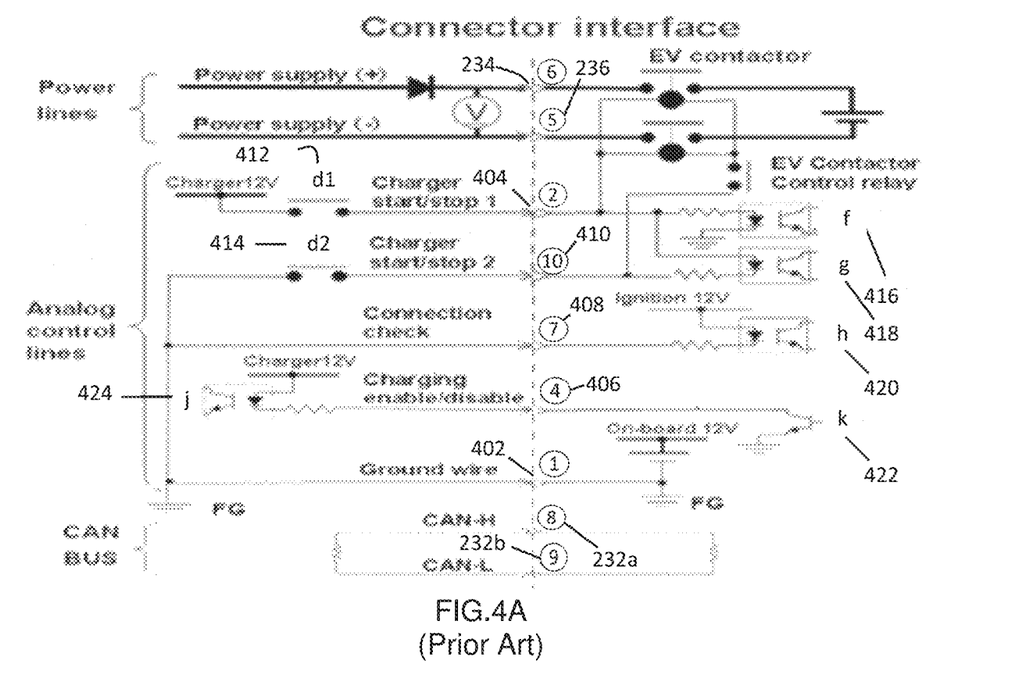
FIG. 4A illustrates an example circuit diagram of a connection between an EV and a charging handles in compliance with the CHAdeMO standard suitable for implementing the several embodiments of the disclosure.
Figure 4B:
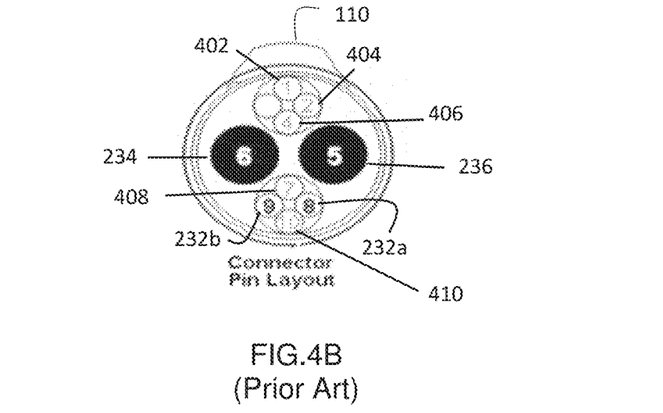
FIG. 4B illustrates an example pin layout of the charging handle in compliance with the CHAdeMO standard suitable for implementing the several embodiments of the disclosure.

FIG. 4A illustrates an example circuit diagram of a connection between the EVs 102, 104 and the charging handles 108, 110 in compliance with the CHAdeMO standard. FIG. 4B illustrates an example pin layout of the charging handles 108, 110 according to this implementation. As discussed above, there is positive terminal 234 and negative terminal 236. There is also a data connector 232, implemented as a CAN bus with a data connector 232a and a data connector 232b. Additionally, there are a set of analog connectors 402-410 for exchanging analog signals between the EVs 102, 104 and the charging handles 108, 110. The analog connectors include a ground wire connector 402, a first charger start/stop connector 404, a charging enable/disable connector 406, a connection check connector 408, and a second charger start/stop connector 410.

As shown in FIG. 4A there are switches 412, 414 and a circuit 424 on the charging handles 108, 110. Additionally, there are circuits 416, 418, 420, and 422 on the EVs 102, 104 that operate to facilitate charging, as described in more detail below with reference to FIG. 5.

Figure 5:
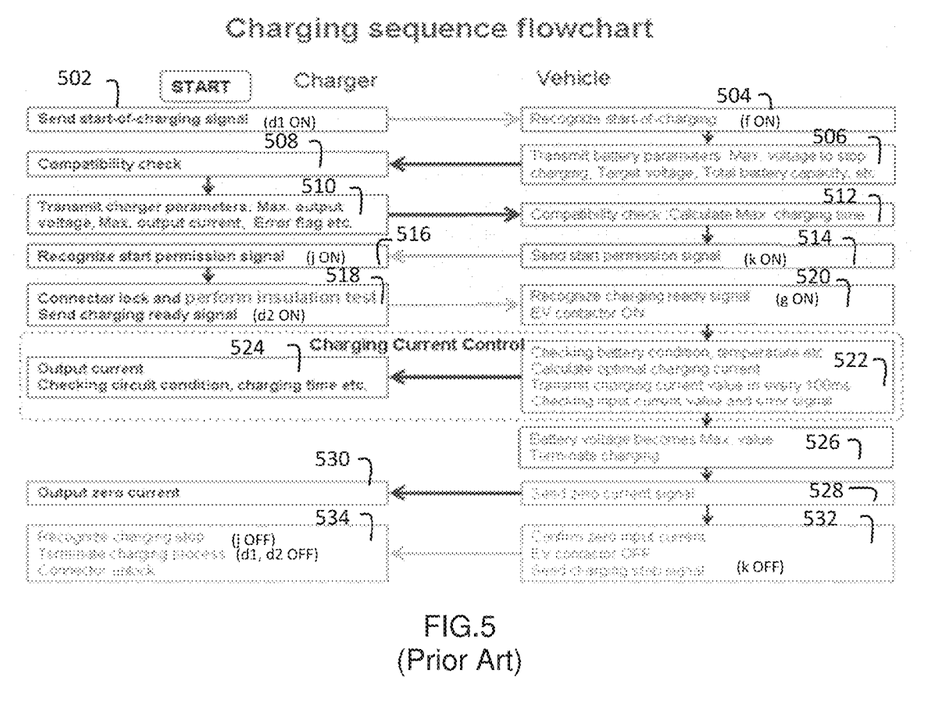
FIG. 5 illustrates a process diagram for charging between EVs with the PECC unit in compliance with the CHAdeMO standard suitable for implementing the several embodiments of the disclosure.

FIG. 5 illustrates a process diagram for charging between the EVs 102, 104 with the PECC unit 106 using the pin layout and circuit diagram of FIGS. 4A and 4B. For simplicity, the process is described from the perspective of a connection between $EV_A$ 102 and the charging handle 108. At 502, a start-of-charging signal is sent from the charging handle 108 to the $EV_A$ 102 over the analog connector 404 by closing switch 412. At 504, the $EV_A$ 102 recognizes the start-of-charging by turning on circuit 416. At 506, $EV_A$ 102 transmits battery parameters of $EV_A$ 102 via the CAN data connectors 232a, 232b to the DSP 224. The battery parameters may include a maximum voltage to stop charging, a minimum voltage to stop charging, a target voltage, a total battery capacity, etc. At 508, the DSP 224 performs a compatibility check to verify that the PEEC unit 106 is compatible with $EV_A$ 102. At 510, the DSP 224 transmits charger parameters via the CAN data connectors 232a, 232b to the $EV_A$ 102. The charger parameters may include parameters such as a maximum output voltage, a maximum output current, an error flag, etc. At 512, the $EV_A$ 102 performs a compatibility check to verify that $EV_A$ 102 is compatible with PECC unit 106. The $EV_A$ 102 also calculates a maximum charging time based on the provided charger parameters.

At 514, $EV_A$ 102 sends a start permission signal over the analog connector 406 to the charging handle 108 by turning on circuit 422. At 516, the charging handle 108 recognizes the start permission signal by turning on circuit 424. At 518, the charging handle 108 locks the connector, performs an insulation test, and sends a charging ready signal over analog connector 410 to the EV$_A$ 102 by closing switch 414. At 520, the EV$_A$ 102 recognizes the charging ready signal by turning on circuit 418. At this point charging commences.

At 522, the EV$_A$ 102 checks the battery condition and temperature of the battery of EV$_A$ 102. The EV$_A$ 102 calculates a an optimal charging current, checks the input current value and whether an error signal has been received from the DSP 224 over the CAN data connectors 232a, 232b. The EV$_A$ 102 also periodically transmits (e.g., every 100 ms) a charging current value to the DSP 224. Likewise, at 524, the DSP 224 receives the optimal charging current from EV$_A$ 102 and accordingly checks, and adjusts as needed, the circuit configuration of the switches 216, 218 in the charging handle 108. The DSP 224 may perform other checks, such as a check of the charging time, etc.

At 526, the EV$_A$ 102 determines that the voltage has reached the maximum voltage for the EV$_A$ 102 and that charging should terminate. At 528, EV$_A$ 102 sends a zero current signal to the DSP 224 over the CAN data connectors 232a, 232b. At 530, the DSP 224 operates to output zero current from the PECC unit 106. At 532, EV$_A$ 102 sends a signal to confirm zero input current over analog connectors 406, 410 by turning off circuits 416, 422. At 534, the charging handle 108 recognizes the charging stop signal by turning off circuit 424. The charging handle 108 also terminates the charging process by turning off circuits 412, 414 and unlocking the charging handle 108.

A generalized description of the above process as applied to charging EV$_B$ 104 using EV$_A$ 102 using the PEEC unit 106 is provided below. The charging handle 108 sends the start of the discharging signal to EV$_A$ 102. EV$_A$ 102 recognizes the start of discharging. EV$_A$ 102 transmits battery parameters to DSP 224 inside the charging handle 108 thru CAN data connectors 232a, 232b. The battery parameters may include maximum discharge current available, state of charge, battery terminal voltage, etc. The DSP 224 performs a compatibility check with EV$_A$ 102. EV$_A$ 102 is ready for discharging and EV$_A$ 102 battery contactors are closed.

DSP 224 sends a start of charging signal to DSP 254 in charging handle 110. Charging handle 110 sends a start of charging signal to EV$_B$ 104. EV$_B$ 104 recognizes the start of charging. EV$_B$ 104 transmits battery parameters to DSP 254 inside charging handle 110 thru CAN data connectors 232a, 232b. The battery parameters may include a maximum charge current available, state of charge, battery terminal voltage, max voltage to stop charging, etc. The DSP 254 performs a compatibility check of with EV$_B$ 104. DSPs 224, 254 perform a configuration set-up of the power electronics switches 212, 214, 242, 244 depending on the voltage levels on EV$_A$ 102 and EV$_B$ 104. EV$_B$ 104 is ready for charging and EV$_B$ 104 battery contactors are closed. At this point charging occurs. Charging and discharging current control is performed through communications with DSPs 224, 254. This may include checking battery conditions, temperature, and voltages in both EV$_A$ 102 and EV$_B$ 104. The DSPs 224, 254 may also calculate the optimal charging current, update the configuration of the power electronics switches 212, 214, 242, 244 if the operation mode changes, and other such communications periodically, such as every 100 ms, to control the operation of the charging.

Figure 6:
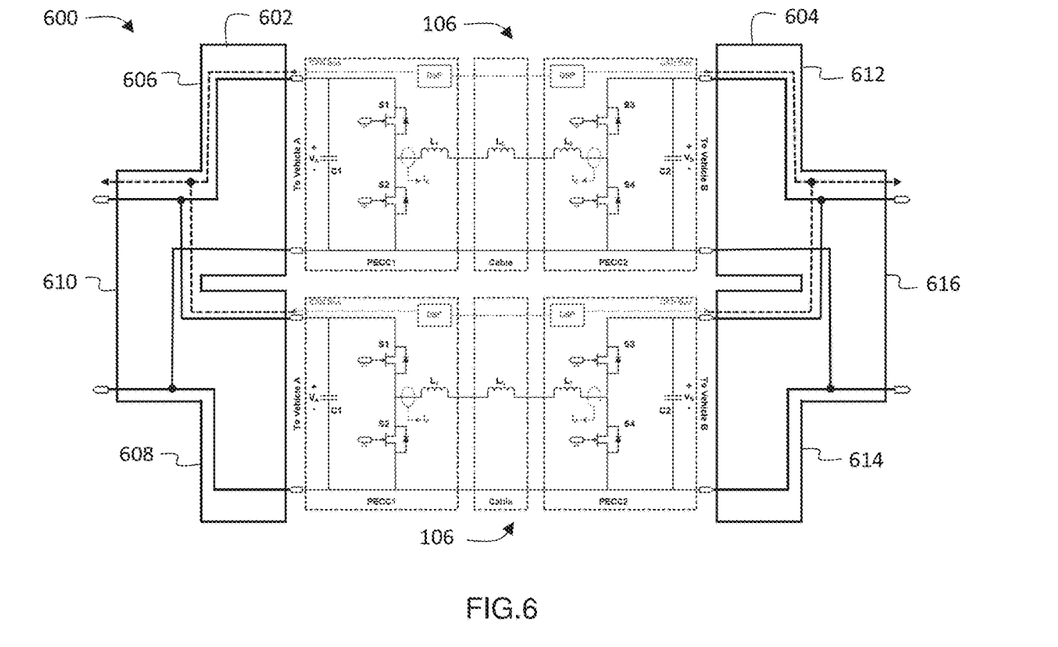
FIG. 6 illustrates two PECCs connected in parallel to respective y-adapters suitable for implementing several embodiments of the disclosure.

FIG. 6 illustrates a system diagram of V2V charging system 600. The V2V charging system includes two PECC units 106 connected in parallel to respective y-adapters 602, 604 suitable for implementing several embodiments of the disclosure. By stacking the PECC units 106 in parallel, the power transfer between EVs is doubled. Each of the y-adapters 602, 604 electrically connect the communication bus, charge line, and ground line from the connected charging handles of each of the PECC units 106. For example, the charging handle 108 of a first PECC unit 106 is connected to a first socket 606 of the y-adapter 602. Likewise, the charging handle 108 of a second PECC unit 106 is connected to a second socket 608 of the y-adapter 602. The y-adapter electrically couples the data connector 202, positive terminal 204, and negative terminal 204 from the first and second PECC units 106. The y-adaptor 602 also includes a plug 610 configured to connect to an EV and including corresponding data connector and positive and negative terminals.

Similarly, the charging handle 110 of the first PECC unit 106 is connected to a first socket 612 of the y-adapter 604. Likewise, the charging handle 110 of the second PECC unit 106 is connected to a second socket 614 of the y-adapter 604. The y-adapter electrically couples the data connector 232, positive terminal 234, and negative terminal 236 from the first and second PECC units 106. The y-adaptor 604 also includes a plug 616 configured to connect to an EV and including corresponding data connector and positive and negative terminals.

Figure 7:
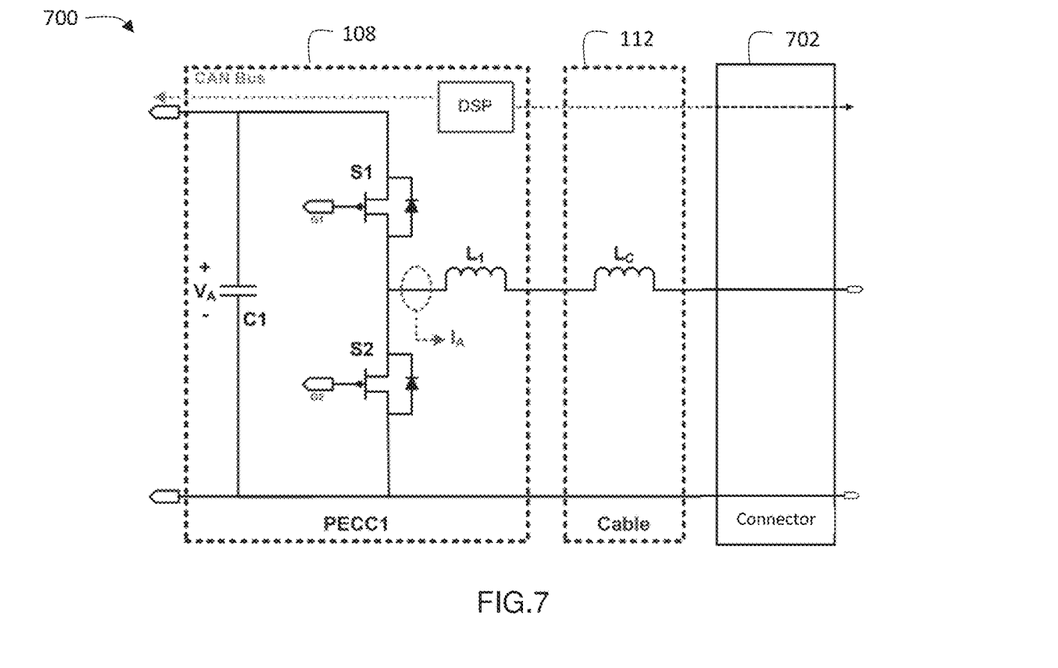
FIG. 7 illustrates a PECC with a half-bridge DC-to-DC converter suitable for implementing the several embodiments of the disclosure.

FIG. 7 illustrates a PECC unit 700 with a single half-bridge DC-to-DC converter suitable for implementing the several embodiments of the disclosure. The PECC unit 700 includes the charging handle 108 and the cable 112. Rather than terminating with the charging handle 110, the PECC unit 700 terminates with a connector 702. The PECC unit 700 allows for further reducing the size and cost of the PECC unit such that the cost and storage space for the PECC unit 700 can be spread between the owners of EV$_A$ 102 and EV$_B$ 104. The connector 702 is configured to connect to a companion PECC unit 700 so as to form a DC-DC full-bridge converter. As shown in FIG. 7, the connector 702 includes for CAN bus connector, a positive terminal line, and a negative terminal line. In some implementations, the connector may include both pins and sockets for each of the CAN bus, positive terminal line, and negative terminal line so as to form a universal connector. Each pair of CAN bus, positive terminal line, and negative terminal line pin and socket are electrically connected to each other. For example, a CAN bus pin and CAN bus socket are both electrically connected to each other and a CAN bus line that extends through the cable 112. In some implementations, a connection adapter (not shown) may be used to connect two PECC units 700 together. For example, the connection adaptor may include sockets for each of the CAN bus, positive terminal line, and negative terminal line on both sides of the connection adaptor for connecting together two PECC units 700.

A 5 kW converter prototype DC-DC half-bridge was built. The prototype included a 5 kW hard-switched half-bridge DC-DC converter utilizing SiC MOSFETs from Monolith semiconductor. The prototype achieved a peak efficiency of 98.4% and a 20% load efficiency of 97.2% at a power density of 80 W/in$^3$.

Figure 8:
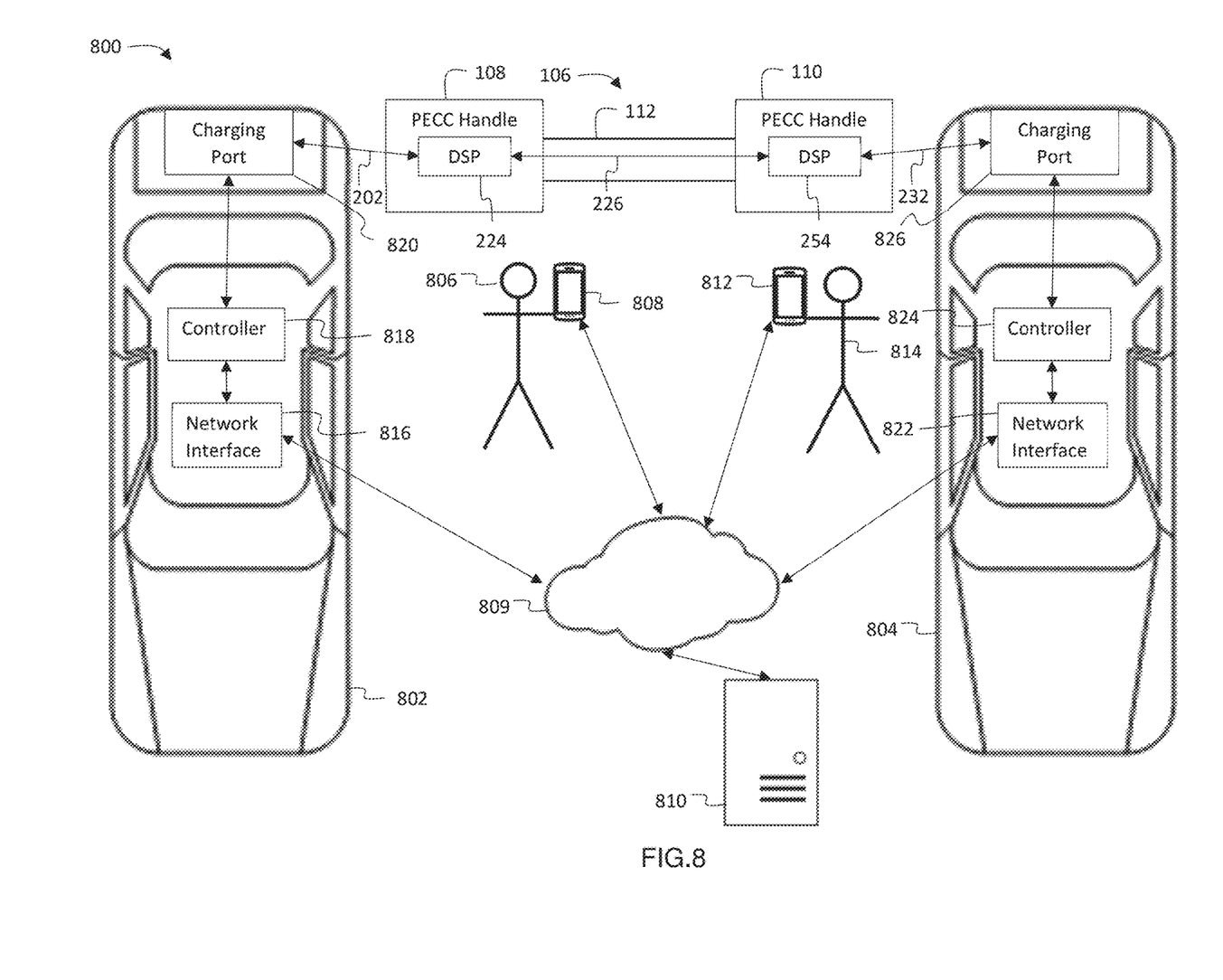
FIG. 8 illustrates a system diagram of a charge sharing network (CSN) suitable for implementing the several embodiments of the disclosure.

FIG. 8 illustrates a system diagram of a charge sharing network (CSN) 800 suitable for implementing the several embodiments of the disclosure. The CSN 800 includes a first vehicle 802, a first user device 808, a second vehicle 804, a second user device 812, and a charge sharing server 810 in communication with the first and second vehicles 802, 804 and the first and second user devices 808, 812. A user 814 who desires to charge the second vehicle 804 may submit a charge receiver request through an application on the user device 812 to the charge sharing server 810. The charge sharing server 810 matches up the charge receiver request with a charge supplier that is available to supply charge to the second vehicle 804. In the example shown in FIG. 8, the charge sharing server 810 identifies the first vehicle 802 as available to supply charge to the second vehicle 804. The charge sharing server 810 sends a supplier request message to the user device 808 of a user 806 associated with the first vehicle 802 who is available to supply charge to the second vehicle 804. The user 806 interacts with an application on the user device 806 to accept the supplier request message.

Upon the user 806 accepting the supplier request message, the application on the user device 806 sends an acceptance message to the charge sharing server 810. Upon receiving an acceptance message from the user device 806, the charge sharing server 810 sends an authorization message to the first vehicle 802 authorizing the vehicle to act as a supplier vehicle in an exchange of charge with the second vehicle 804. The charge sharing server 810 may likewise send an authorization message to the second vehicle 804 authorizing the vehicle to act as a supplier vehicle in an exchange of charge with the first vehicle 802. In some implementations, only the supplier vehicle needs to receive an authorization message to facilitate the transfer of charge from a supplier vehicle to a receiver vehicle. In some implementations, the authorization message(s) may be directly communicated between a user device and the supplier or receiver vehicle(s). For example, the user device 808 may directly communicate with the first vehicle 802 to provide the authorization message authorizing the vehicle to act as a supplier vehicle in an exchange of charge with the second vehicle 804.

The first vehicle 802 includes a network interface 816, a controller 818, and a charging port 820. The network interface 816 is configured to receive the authorization message and communicate the authorization message to the controller 818. In response to receiving the authorization message, the controller 818 configures the charging port to allow for sharing charge with another vehicle. In some implementations, configuring the charging port includes opening a charging port door and closing one or more switches or otherwise placing the charging port in electrical communication with a battery pack (not shown) of the first vehicle 802.

Upon the PECC unit 106 being connected to the charging port 820, the DSP 224 in the charging handle 108 initiates a communication session with the controller 818. During the communication session between the DSP 224 and the controller 818, the controller 818 may send one or more messages including data such as that the PECC handle 108 is for a supplier vehicle, a current battery voltage of the battery pack of the first vehicle, a minimum battery pack voltage to stop charging, a target voltage, a maximum output voltage of the battery pack of the first vehicle, a maximum output current of the battery pack of the first vehicle, and any other information that the DSP 224 may need to operate.

Similarly, the second vehicle 804 includes a network interface 822, a controller 824, and a charging port 826. The network interface 822 is configured to receive the authorization message and communicate the authorization message to the controller 824. In response to receiving the authorization message, the controller 824 configures the charging port to allow for sharing charge with another vehicle. In some implementations, configuring the charging port includes opening a charging port door and closing one or more switches or otherwise placing the charging port in electrical communication with a battery pack (not shown) of the second vehicle 804.

Upon the PECC unit 106 being connected to the charging port 820, the DSP 254 in the charging handle 110 initiates a communication session with the controller 824. During the communication session between the DSP 254 and the controller 824, the controller 824 may send one or more messages including data such as that the PECC handle 110 is for a receiver vehicle, a current battery voltage of a battery pack of the second vehicle, a maximum allowed voltage to stop charging of the battery pack of the second vehicle, a target voltage, an optimal charging current value, a total battery capacity, and any other information that the DSP 254 may need to operate. Likewise, the DSP 254 may send one or more messages including data such as a maximum output voltage, a maximum output current, an error flag, or other such information that the controller 824 may need to operate.

Upon each of the DSPs 224, 254 receiving the operating messages from the respective vehicle controllers 818, 824, the DSPs 224, 254 may communicate with each other over the CAN bus 226 in the cable 112. The DSPs 224, 254 then configure the respective DC-DC half-bridge converters based on the description provided above and initiate transfer of charge from the first vehicle 802 to the second vehicle 804.

Many variations in the operation of the CSN 800 may be used and are readily apparent to those of ordinary skill in the art.

It should be appreciated that the logical operations described herein with respect to the various figures may be implemented (1) as a sequence of computer implemented acts or program modules (i.e., software) running on a computing device (e.g., the computing device described in FIG. 9), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 9:
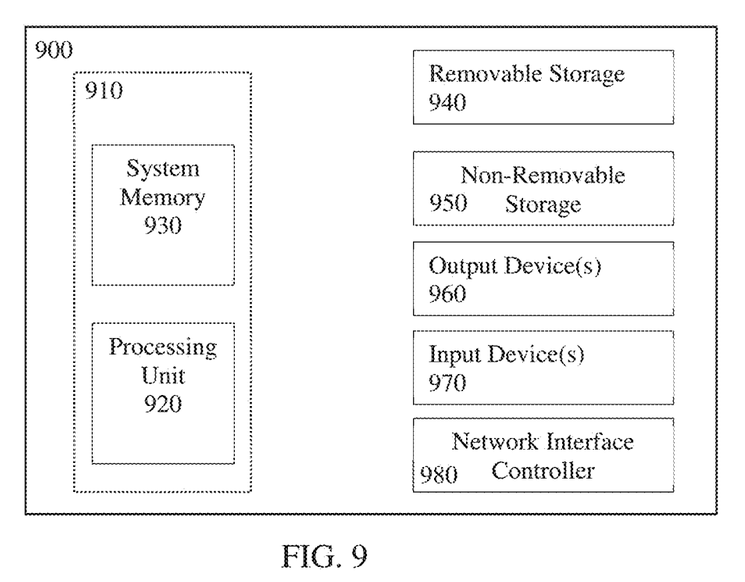
FIG. 9 illustrates an exemplary computer system suitable for implementing the several embodiments of the disclosure.

Referring to FIG. 9, an example computing device 900 upon which embodiments of the invention may be implemented is illustrated. For example, the DSPs, controllers, user devices, and servers described herein may each be implemented as a computing device, such as computing device 900. Some of the components described herein may include more or fewer elements than the example computing device 900 described below. It should be understood that the example computing device 900 is only one example of a suitable computing environment upon which embodiments of the invention may be implemented. Optionally, the computing device 900 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices.

Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 900 to provide the functionality of a number of servers that is not directly bound to the number of computers in the computing device 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 900 typically includes at least one processing unit 930 and system memory 920. Depending on the exact configuration and type of computing device, system memory 920 may be volatile (such as random access memory (RAM)), non-volatile (such as read-only memory (ROM), flash memory, etc.), or some combination of the two. This most basic configuration is illustrated in FIG. 9 by dashed line 910. The processing unit 930 may be a standard programmable processor that performs arithmetic and logic operations necessary for operation of the computing device 900. While only one processing unit 930 is shown, multiple processors may be present. Thus, while instructions may be discussed as executed by a processor, the instructions may be executed simultaneously, serially, or otherwise executed by one or multiple processors. The computing device 900 may also include a bus or other communication mechanism for communicating information among various components of the computing device 900.

Computing device 900 may have additional features/functionality. For example, computing device 900 may include additional storage such as removable storage 940 and non-removable storage 950 including, but not limited to, magnetic or optical disks or tapes. Computing device 900 may also contain network connection(s) 980 that allow the device to communicate with other devices such as over the communication pathways described herein. The network connection(s) 980 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 900 may also have input device(s) 970 such as a keyboards, keypads, switches, dials, mice, track balls, touch screens, voice recognizers, card readers, paper tape readers, or other well-known input devices. Output device(s) 960 such as a printers, video monitors, liquid crystal displays (LCDs), touch screen displays, displays, speakers, etc. may also be included. The additional devices may be connected to the bus in order to facilitate communication of data among the components of the computing device 900. All these devices are well known in the art and need not be discussed at length here.

The processing unit 930 may be configured to execute program code encoded in tangible, computer-readable media. Tangible, computer-readable media refers to any media that is capable of providing data that causes the computing device 900 (i.e., a machine) to operate in a particular fashion. Various computer-readable media may be utilized to provide instructions to the processing unit 930 for execution. Example tangible, computer-readable media may include, but is not limited to, volatile media, non-volatile media, removable media and non-removable media implemented in any method or technology for storage of information such as computer readable instructions, data structures, program modules or other data. System memory 920, removable storage 940, and non-removable storage 950 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 930 may execute program code stored in the system memory 920. For example, the bus may carry data to the system memory 920, from which the processing unit 930 receives and executes instructions. The data received by the system memory 920 may optionally be stored on the removable storage 940 or the non-removable storage 950 before or after execution by the processing unit 930.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A power electronics charge coupler (PECC) unit, comprising:
   a first charging handle comprising a first DC-DC half-bridge converter;
   a second charging handle comprising a second DC-DC half-bridge converter; and
   a cable configured to electrically couple the first charging handle with the second charging handle, wherein the first charging handle and the second charging handle are coupled by the cable to form a DC-DC full-bridge converter, where a portion of a filter inductor of the DC-DC full-bridge converter is provided by parasitic inductance of the cable.

2. The PECC unit of claim 1, wherein the cable comprises a charge line and a ground line separated by a dielectric membrane.

3. The PECC unit of claim 1, wherein the first and second DC-DC half-bridges each comprise:
   a smoothing capacitor connected across a charge line and a ground line of the first charging handle; and
   a pair of switches in series with each other and connected in parallel to the smoothing capacitor across the charge line and the ground line of the first charging handle; and
   a filter inductor with a first side of the filter inductor connected between the pair of switches and a second side of the filter inductor connected to a charge line of the cable.

4. The PECC unit of claim 3, wherein each of the pair of switches is a power MOSFET.

5. The PECC unit of claim 4, wherein the power MOSFET switch is a SiC MOSFET.

6. The PECC unit of claim 5, wherein the SiC MOSFET is two paralleled 25 m$\Omega$ SiC MOSFETs.

7. The PECC unit of claim 5, wherein the SiC MOSFET is a 15 mΩ SiC MOSFET.

8. The PECC unit of claim 4, wherein the power MOSFET is contained in a four-lead TO-247 package.

9. The PECC unit of claim 1, wherein the first DC-DC half-bridge converter comprises a first pair of switches and the first charging handle comprises a first digital signal processor (DSP) adapted to configure the pair of switches to operate the first charging handle as a charge supplier or a charge receiver.

10. The PECC unit of claim 9, wherein the first DSP is adapted to configure one of the first pair of switches to actively modulate a transfer of charge across the PECC unit and the other of the first pair of switches to operate as a synchronous rectifier.

11. The PECC unit of claim 10, wherein the second DC-DC half-bridge converter comprises a second pair of switches and the second charging handle comprises a second DSP adapted to configure the second pair of switches to operate the second charging handle as a charge supplier or a charge receiver.

12. The PECC unit of claim 11, wherein the second DSP is adapted to configure one of the second pair of switches to statically remain on and the other of the second pair of switches to statically remain off.

13. The PECC unit of claim 12, wherein the first DC-DC half-bridge converter is configured to switch between operating between a buck mode of operation and a boost mode of operation.

14. A method of charging a receiver electric vehicle from a supplier electric vehicle with a PECC unit, the method comprising:
    receiving, by a first DSP in a first charging handle of the PECC unit coupled to the supplier electric vehicle, a first message comprising a first value of a voltage of a battery pack of the supplier electric vehicle;
    receiving, by the first DSP, a second message comprising a second value of a voltage of a battery pack of the receiver electric vehicle;
    comparing, by the first DSP, the first value to the second value to determine which is larger; and
    configuring, by the first DSP, a first pair of switches in a first DC-DC half-bridge converter in the first charging handle based on the comparison, wherein the PECC unit further comprises a second charging handle with a second DC-DC half-bridge converter and a cable configured to electrically couple the first charging handle with the second charging handle, wherein the first charging handle and the second charging handle are coupled by the cable to form a DC-DC full-bridge converter, where a portion of a filter inductor of the DC-DC full-bridge converter is provided by parasitic inductance of the cable.

15. The method of claim 14, further comprising:
    receiving, by a second DSP in the second charging handle of the PECC unit coupled to the receiver electric vehicle, a third message comprising the second value of the voltage of the battery pack of the receiver electric vehicle;
    receiving, by the second DSP, a fourth message comprising the first value of the voltage of the battery pack of the supplier electric vehicle;
    comparing, by the second DSP, the first value to the second value to determine which is larger; and
    configuring, by the second DSP, a second pair of switches in a second DC-DC half-bridge converter in the second charging handle based on the comparison.

16. The method of claim 14, wherein configuring the first pair of switches in the first DC-DC half-bridge converter comprises configuring one of the first pair of switches to actively modulate a transfer of charge from the supplier electric vehicle to the receiver electric vehicle and the other of the first pair of switches to operate as a synchronous rectifier.

17. The method of claim 14, wherein configuring the first pair of switches in the first DC-DC half-bridge converter comprises configuring one of the first pair of switches to statically remain on and the other of the first pair of switches to statically remain off.

18. The method of claim 14, further comprising:
    receiving, by the first DSP, fifth message with a value of a minimum allowed voltage of the battery pack of the supplier electric vehicle.

19. The method of claim 15, further comprising:
    receiving, by the second DSP, a sixth message with a value of a maximum voltage of the battery pack of the receiver electric vehicle.

\* \* \* \* \*